United States Patent Office 3,455,264
Patented July 15, 1969

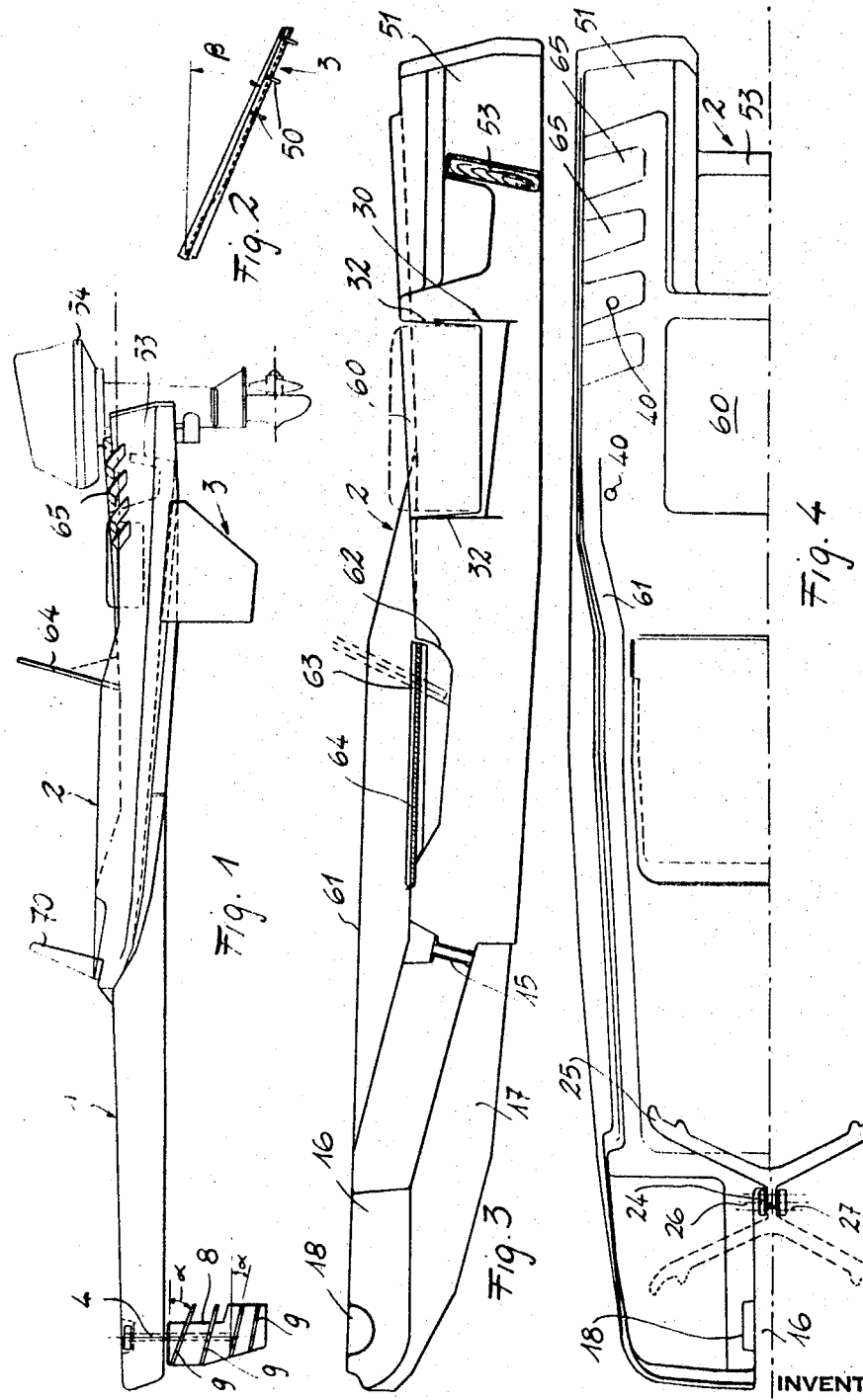

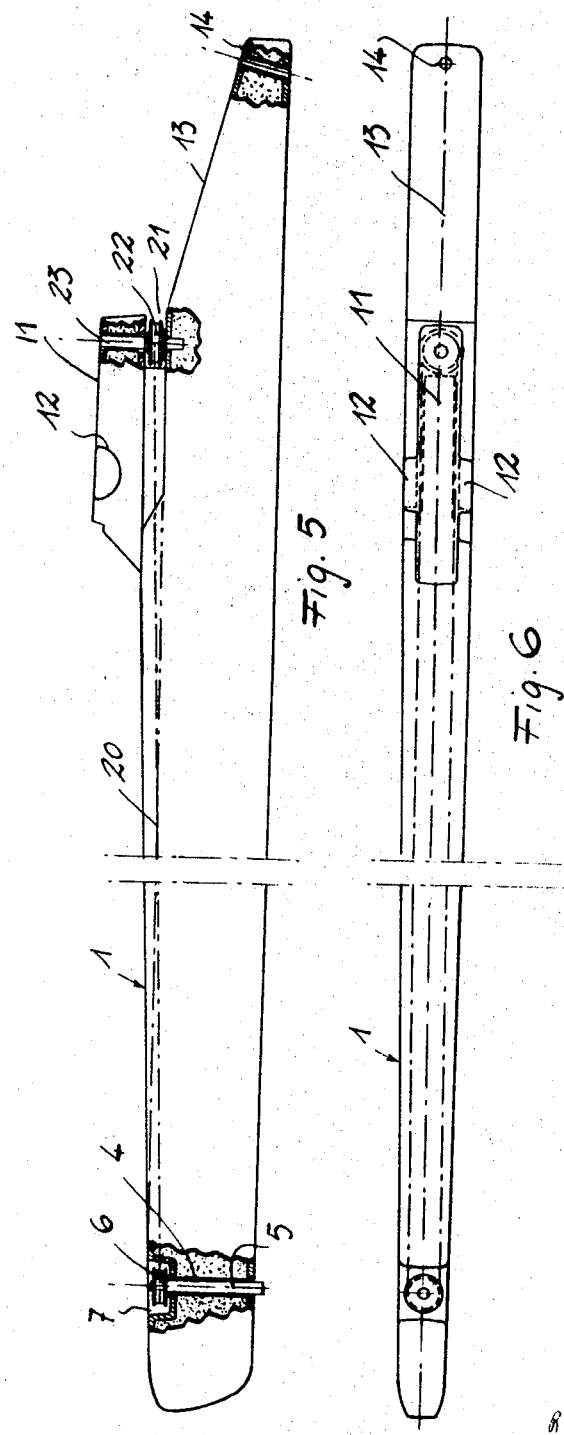

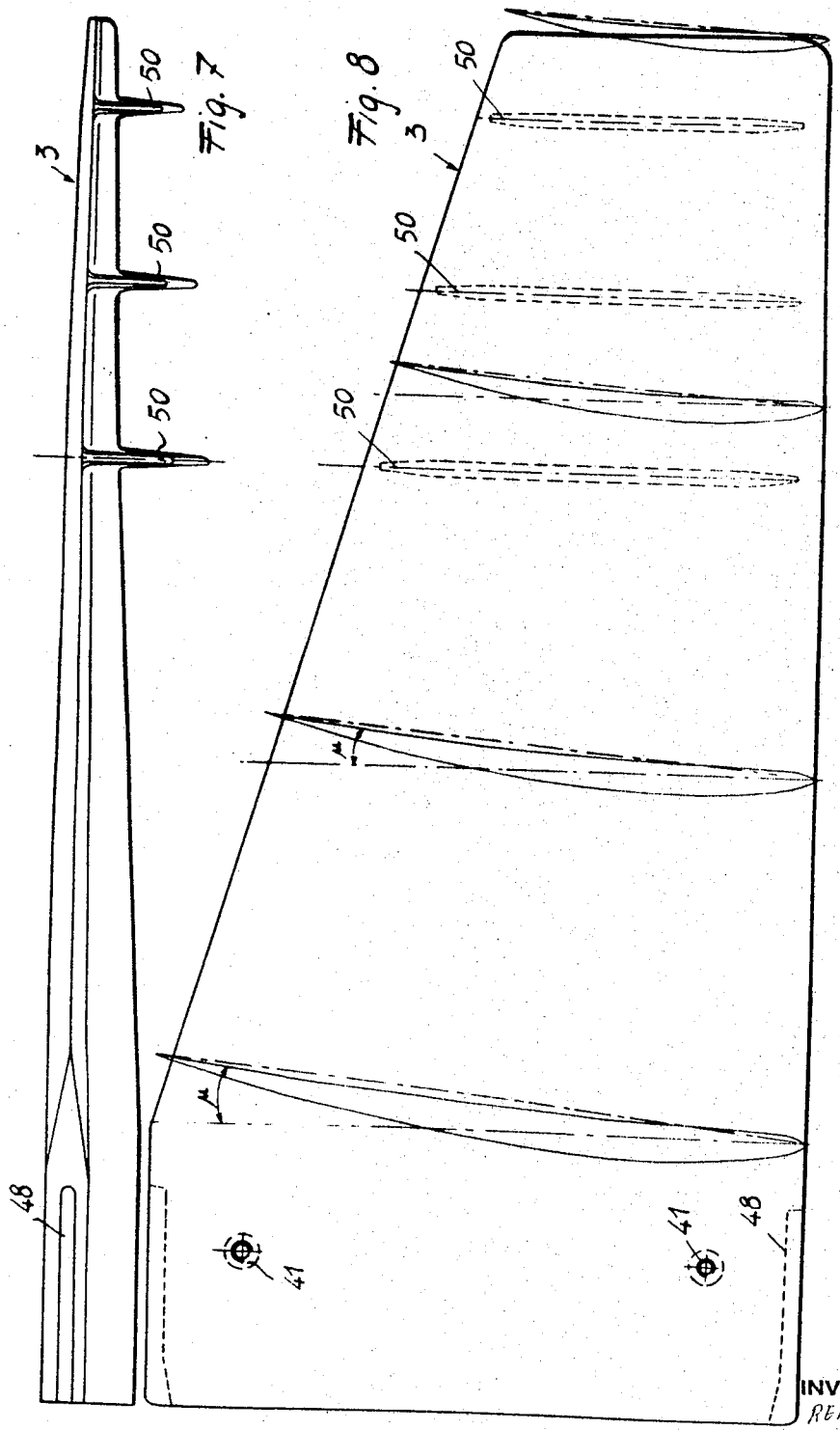

3,455,264
WING BEARING CRAFT
Renato Castellani, Via Baiettini 86,
Verbania-Intra, Novara, Italy
Filed Feb. 28, 1967, Ser. No. 619,418
Int. Cl. B63b 1/26
U.S. Cl. 114—66.5                                9 Claims

ABSTRACT OF THE DISCLOSURE

A boat of the hydrofoil type. The boat is in the form of a wing bearing craft having an elongated floatable body provided with bow and stern ends. At the region of its stern end, this body fixedly carries a pair of side wings which are downwardly inclined from their inner ends which are connected to the body toward their outer ends which are distant from the body. In addition, the floatable body carries at the region of its bow end a front wing means which when projected onto a horizontal plane with said side wings becomes located at the apex of an isosceles triangle having a base at whose ends the side wings are respectively projected, and the height of this triangle is greater than the base thereof.

---

This invention relates to a dismantleable wing bearing craft, designed to bear with three separate zones on water surface (when attaining a given speed).

It is known that actual boats necessarily allow only moderate speeds with respect to the available power because of the substantial surface contacting the water and thus generating a high resistance against movement, on the other hand such a surface being essential in order to achieve buoyancy by usual principles.

There are also the so-called "hydrofoils," in which on attaining a given speed the hull or body (of a conventional character) bears on the water at four or more zones by means of bearing skids.

It is the main object of the present invention to provide a craft, which may be considered as within the hydrofoil class, since at a relatively high speed the bearing thereof is committed to water bearing surfaces, but which are formed, as compared with the conventional surfaces, of wing areas jointly defining a self-stable system, that is a system in which the unbalancing effect on any carrier wing influences the remaining wings with such an effect that the craft balance is automatically established.

It is another object of the present invention to provide a wing bearing craft in which, in addition to bearing, a direction rudder function is committed to one of the wings.

A still other object of the present invention is to provide a wing bearing craft capable of being readily dismantled in parts, the dimensions of each of which being relatively reduced.

It is another object of the invention to provide a wing bearing craft by which a very substantial side stability is attained.

A still other object of the present invention is to provide a light wing bearing craft, preferably of plastics material reinforced by fibers, in which the metal portions are minimized.

A still other object of the present invention is to provide a new single-seater wing bearing craft, considerably indifferent to wave motion, in which a prone as well as a standing position can be taken owing to its substantial stability.

The invention is concerned with a new craft, which is conceived as a self-floating structure carrying two downwardly inclined cantilever wings and a multi-wing area front rudder, so that craft bearing is provided as a function of speed only by zones of the above wing surfaces arranged as an isoscles triangle (the height of which being greater than the base), while all of the craft body emerges and does not cantact the water surface.

The present invention will be better understood from the following detailed description, given by mere way of example and thus of not limitation, particularly referring to the appended drawings, in which:

FIG. 1 is a side elevation of the craft according to the invention;

FIG. 2 diagrammatically shows a side wing inclination, when said wing is secured to the hull or body;

FIG. 3 is an enlarged sectional view according to line III—III in FIG. 4 of the main body of the craft;

FIG. 4 is a top view of the main body of the craft;

FIG. 5 is a side elevational view with cutaway portions showing the bow member of the craft according to the invention;

FIG. 6 is a plan view of the bow member in FIG. 5;

FIG. 7 is a front view of one of the side wings;

FIG. 8 is a top view of the wing in FIG. 7 with various sections designed to illustrate the wing outline;

Figure 9:
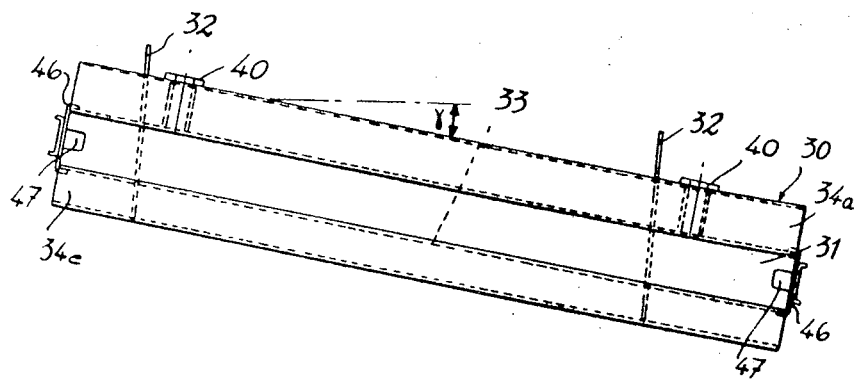
FIG. 9 is a side view of the saddle incorporated within the main body of the craft.

Referring to the figures, the craft is comprised of four basic parts, that is a beam-like extended bow member 1, a main body 2, to which member 1 is connected, and a pair of side carrier wings 3, designed to be connected to main body 2, as hereinafter described.

All of these four basic parts are made of resin-glass, that is of synthetic material reinforced by glass fibers, and are completely filled with expanded plastics material.

Bow member 1 incorporates a sleeve 4 within which a pin 5 is rotatably mounted, said pin terminating at the top with a pulley 6 nested within a bore 7 at the bow end of body 1. A core 8 is fixed to pin 5, said core acting as a rudder and located according to the invention at the bow end of the craft. Core 8 extends at right angles to the water surface and therefrom outwardly project on two sides a series of wing areas 9 of a wide open V-like arrangement and a decreasing surface from top to bottom, and characterized by an airfoil, the angle $\alpha$ of incidence of which (angle formed between horizontal and wing outline chord) makes a decreasing angle from top to bottom.

This direction rudder also carries out a carrier function and in proportion with said craft speed will provide for water bearing of pre-determined wing areas.

At a raised narrow zone 11, bow member 1 of the craft has two symmetrical projections 12, the function of which is to take part in the connection between the bow member 1 and main body 2 of the craft.

Bow member terminates at the end with an inclined face 13 where a threaded sleeve 14 is incorporated, said sleeve acting to allow the connection of a threaded pin passing through a sleeve 15 incorporated within main body 2.

Main body 2 has at the front a slot 16 downwardly opening to a recess 17, the shape of which corresponds to that of the rear end of member 1. At the upper portion of slot 16, in which slot the raised zone 11 seats, two recesses 18 are provided, the shape of which corresponds to that of projections 12 on the bow member.

Bow member 1 penetrates this slot at right angles to the main body until setting projections 12 with main body seatings 18; then bow member is rotated about such a hinge bringing it to the position of FIG. 1, at which position the coupling of the two aforesaid elements is achieved through a threaded pin passing through sleeve 15 incorporated within the main element and screwing into bush 14.

Bow member 1 has two longitudinal ducts, not shown in the figures, opening at one end into recess 7 where the rudder pulley 6 is accommodated; such ducts are for passage of control cables 20 of the rudder, which cables terminates at a bore 21 at the end of raised zone 11 and located at level with the groove end 16 of the main body. In such a bore a pulley 22 is provided, said pulley being connected to a rotatable shaft 23 mounted within a sleeve embedded within bow member 1. The shaft passing through the sleeve terminates at the top with a fork 24, between the arms of which the guide or drive handle 25 is hinged, which handle may be brought to one of the two positions shown in the figure by a simple rotation about pivot pin 26. The handle may be restrained to either of the two aforesaid positions through a pin 27 or other suitable means passing through both the handle and fork arms 24 at a displaced position to pin 26.

Adjacent the stern, main body 2 has an embedded metal saddle 30 acting to strengthen main body 2 at the attachment area of side wings 3, said attachment area being formed of two inclined grooves 31 (one for each side) provided within said saddle.

Figure 10:
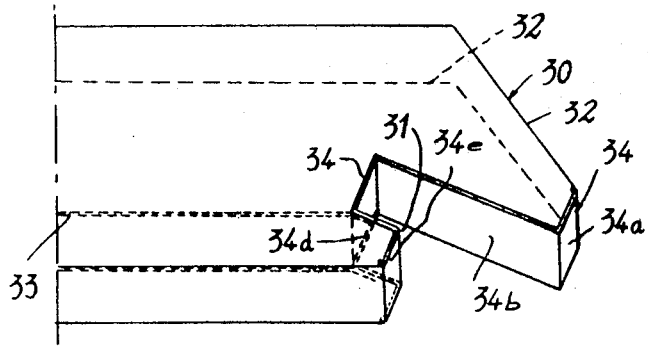
FIG. 10 is a horizontal view of the saddle as incorporated within the main body of the craft, located therefore at an inclined position to horizontal, some parts having been omitted for sake of clarity.
Figure 11:
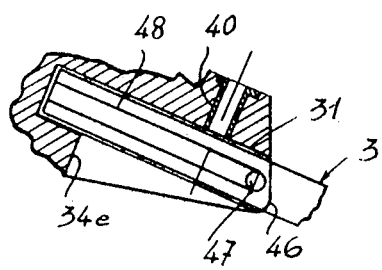
FIG. 11 is a fragmentary sectional view showing the detail of a side wing connection to the saddle.

Saddle 30, the position of which within body 2 can be seen from FIG. 3, substantially comprises (see FIGS. 9, 10, 11) a pair of plates 32 substantially at right angles to the longitudinal axis of the craft, parallel to and mutually spaced apart from each other. These two plates 32 are interconnected by a bottom plate 33, such as by welding, and laterally as well by a pair of channel-like sections 34 having dissimilar sides extending with an inclination to the longitudinal length of the craft, that is, so as to impart some inclination to side wings 3. Particularly, sections 34 include faces 34a, e.

To such sections defining on each side of the main body the seating penetrated by the end of wings 3, a pair of unthreaded bushes 40 are connected by welding, pins (not shown) being caused to pass therethrough and designed to be screwed in threaded bushes 41 embedded within side wing structure.

Front ends of the two channels 31, designed to receive wings 3, are intercepted by welded plates 46 having pins 47 on the inner side thereof, which pins are intended to penetrate grooves 48 at the ends of said wings.

Space 31, within which wings 3 are accommodated, makes an inclination to horizontal of about 15–30°, preferably of about 20–25°; the angle being concerned with is the angle made by horizontal as seeing the craft from one of its ends. Space 31 makes with horizontal (as seeing the craft sideways) an angle $\gamma$ between 3 and 10°, preferably 5–8° (see FIG. 9). The two wings, located adjacent the craft stern, have a wing outline with a decreasing angle of incidence $\mu$ as departing from the hull or body (see FIG. 8).

As clearly seen from the drawings, at the rear main body 2 has two fins 51 defining a recess 52 wherein, incorporated within the body material, a wood insert 53 is provided, said insert acting as a stern false face or fastening the outboard engine 54 (see FIG. 3).

Still within main body 2 and between the two vertical plates 32 of the saddle a space 60 is provided for accommodating the fuel tank of the outboard engine.

For some length, a side wall 61 extends on two sides of the main body. The two side walls 61 define the area within which the driver takes place. Such an area communicates with a recess 62, to the walls of which a plate 64 is hinged at 63, which plate 64 covers at the position shown by full line in FIG. 3 such a recess and enables therefore the craft driver to drive the craft being at a prone position, in which position his feet are received in slots 65 laterally provided in the main body and located at such a distance from one another that they may be used by persons of a different heights.

At the dash and dot line position (FIG. 3), the rotable plate 64 serves as a back for the driver who, in this case will drive in a seated position and with his feet will operate on the handle positioned as shown by the solid line in FIG. 4. The driver being prone, as previously described, the handle 25 will be at the other position shown by dash and dot line in FIG. 4.

Although not shown on either side wall 61 of the main body, engine control devices will be provided, that is those for engine rotation speed and running direction (forward and rear directions).

Although not shown, at a suitable position of main body 2 an electric contact member will be provided, which contact member will break the electric engine circuit when nobody is on the craft. Particularly, a microswitch may be provided and arranged on pivot axis (resiliently yieldable supported) of the back, which microswitch will hold the electric engine circuit closed in either position of the back, provided that at least a portion of the driver's weight burden thereto.

The craft may be equipped with a windscreen 70 securable to the hull or body in any known way.

The craft according to the invention is characterized by its high stability, that is by its high indifference to pitching and rolling even if intentionally caused. As an additional feature, veering is without transverse trim of the craft undergoing a substantial change.

While in the conventional crafts a wave impact effect occurs, which will influence the whole structure and driver, in the case of the inventive craft this effect is cancelled by the particular dynamic function of the wings, so as to allow driving to be accomplished at a prone position without any discomfort.

The craft is easily and readily dismantleable and comfortably transportable, occupying (when disassembled) a relatively small area.

From the foregoing, operation of the craft according to the invention will be apparent and may be summarized as follows: when stationary, the craft will float on the water easily supporting the driver's weight; on gaining speed, the hull will emerge and proportionally to the speed lift is carried out by the front rudder wings which are always lower and of a more restricted surface, while also a portion of the surface of wings 3 emerges, the lift being assumed by the end areas of said wings.

I claim:

1. A wing bearing craft comprising a floatable elongated body having opposed bow and stern ends and carrying at the region of said stern end a pair of side wings downwardly inclined from inner ends respectively adjacent said body toward outer ends respectively distant from said body and at least one wing means placed forward of said side wings in the region of said bow end of said body, so that when the craft is runnnig, bearing is assigned to areas of said wings and wing means, said areas being arranged when projected onto a horizontal plane at the corners of an isosceles triangle having the height thereof greater than the base thereof, the projected areas of said side wings being located at the ends of said base and the area projected from said forward wing means being located at the apex of said triangle.

2. A craft according to claim 1, wherein said wing means is combined with a boat rudder, and said wing means including cantilever wing elements projecting from a rudder rib, the plane of which is substantially at right angles to the liquid surface on which the craft floats.

3. A craft according to claim 2, wherein said wing elements are located at different heights, and have different inclinations and dimensions.

4. A craft according to claim 3, characterized in that the inclination of the wing elements on the rib decreases from one end to the other of said rib.

5. A craft according to claim 3, characterized in that the wing elements on the rib have an inclination to horizontal which decreases as the rib departs from the body.

6. A craft according to claim 3, characterized in that the wing elements arranged along the rib are of a decreasing area as departing from the body.

7. A craft according to claim 1, characterized in that the side wings laterally make with horizontal an inclination of about 15–30°, preferably 20–25°.

8. A craft according to claim 1, wherein said body is formed of two parts, a bow member and a main body, removably interconnected, said bow member having at the bow end a direction rudder of multi-wing areas forming said wing means, while the main body removably carries the side wings adjacent the stern.

9. A craft according to claim 1, characterized in that the side wings have shifting fins.

References Cited

UNITED STATES PATENTS

| | | | |
|---|---|---|---|
| 857,951 | 6/1907 | Meacham | 114—66.5 |
| 1,776,700 | 9/1930 | Pegna | 114—66.5 |
| 2,748,400 | 6/1956 | Kregall | 114—66.5 X |
| 2,749,870 | 6/1956 | Vavra | 114—66.5 |

ANDREW H. FARRELL, Primary Examiner